March 2, 1943.  M. H. ALLDREDGE  2,312,516
JOINT ASSEMBLY
Filed June 8, 1940   2 Sheets-Sheet 1
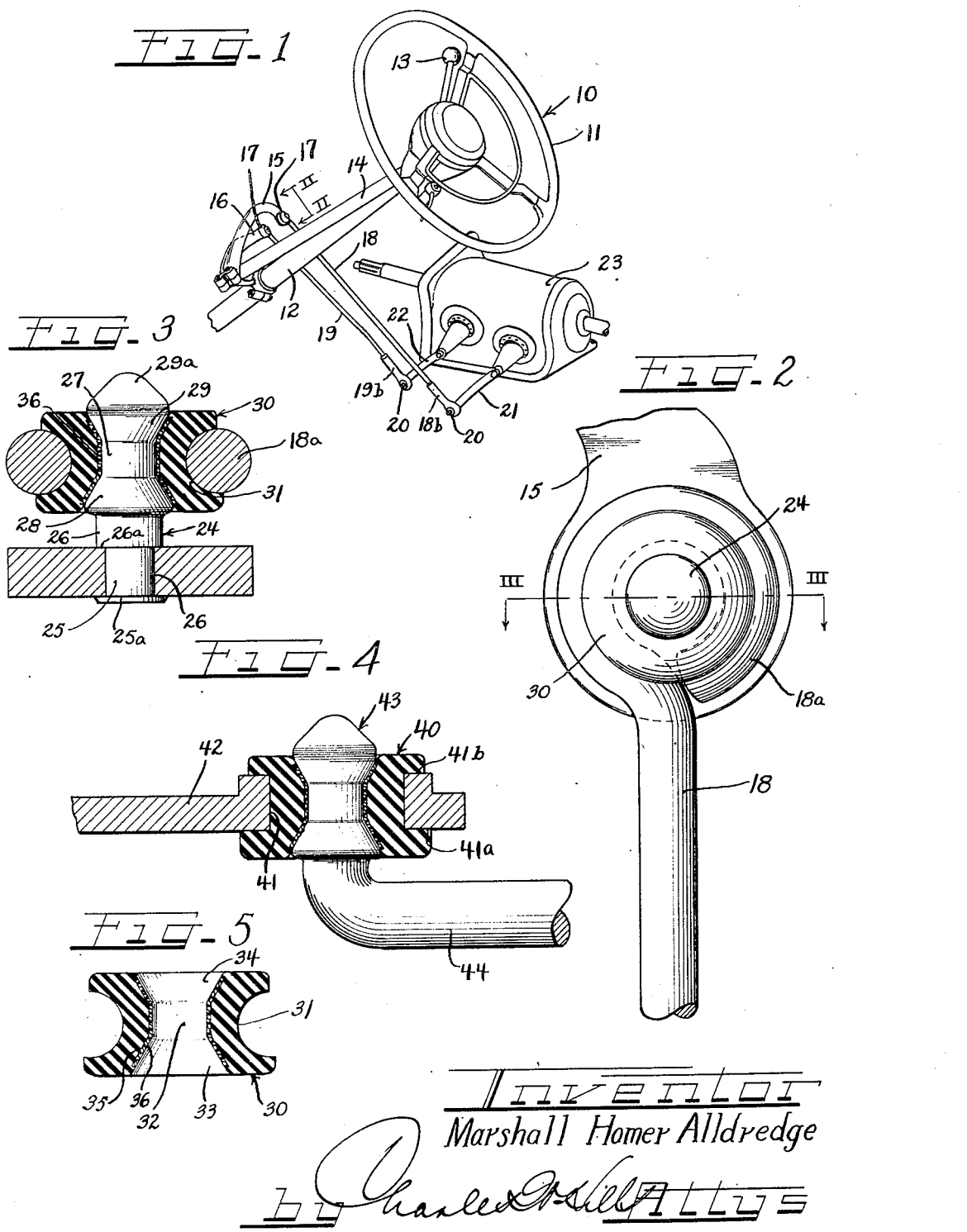
Inventor
Marshall Homer Alldredge

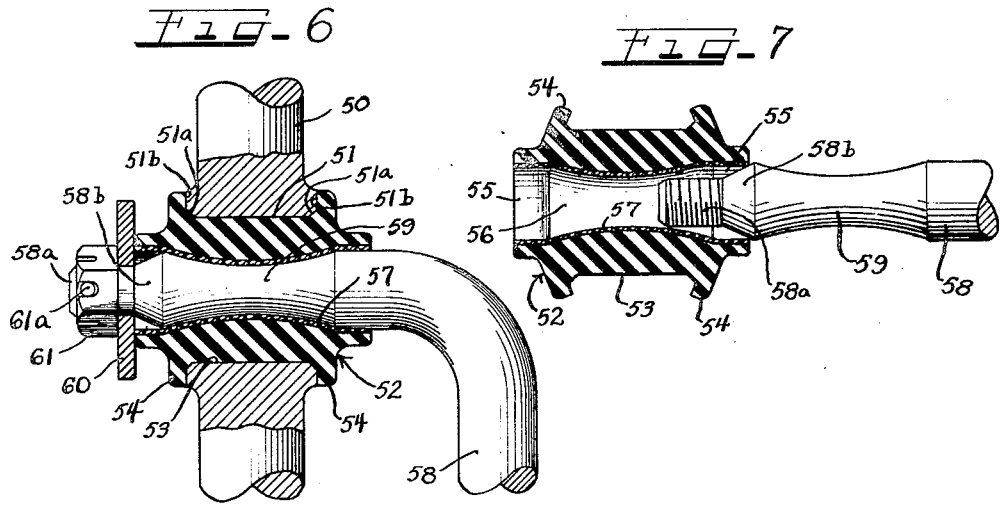
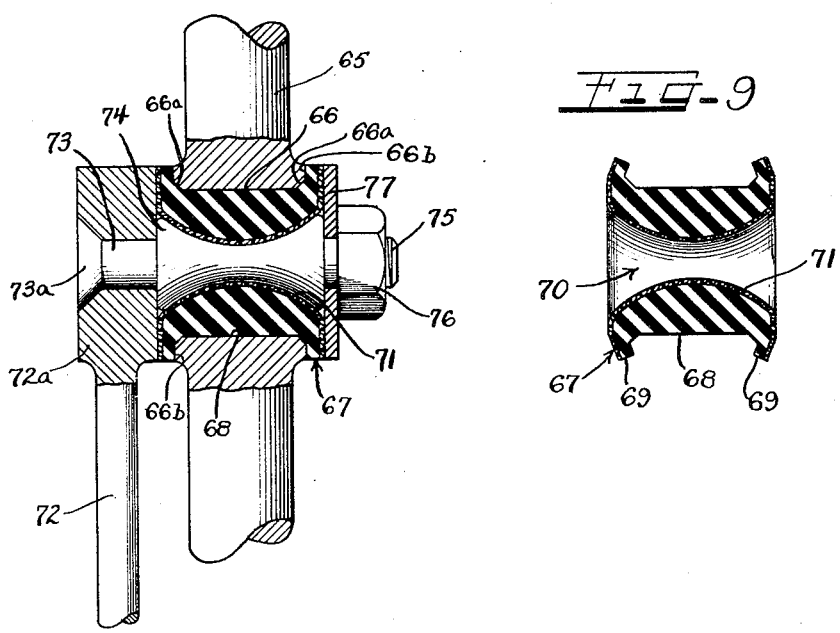

Patented Mar. 2, 1943

2,312,516

UNITED STATES PATENT OFFICE 2,312,516

JOINT ASSEMBLY

Marshall Homer Alldredge, Detroit, Mich., assignor to Thompson Products Incorporated, Cleveland, Ohio, a corporation of Ohio Application June 8, 1940, Serial No. 339,421

8 Claims. (Cl. 287—85)

This invention relates to joint assemblies permitting limited universal movement through interparticle flow of a resilient bushing and more specifically relates to joint assemblies including rubber bushings having spool- or hour-glass-shaped bores therethrough lined with lubricant-impregnated fabric and adapted to receive a male member or stud with a constricted throat portion and retain the same therein.

The invention is especially adapted for use in connection with gear shift rod connections for automotive vehicles and, while the invention will be specifically hereinafter described for such usage, it should be understood that the joints of the invention are useful in all types of linkage wherein relative limited universal movement is desired between the parts.

According to the invention a rubber bushing having a spool- or hourglass-shaped bore therethrough lined with a lubricant-impregnated fabric provides a bearing seat for a male member such as a stud. The male member has a bearing portion which is also spool- or hourglass-shaped. The constricted throats provided by such shapes effectively retain the bushing and male member in assembled relation. The male member can be forced into and out of the bushing by compression of the rubber but the cooperating constricted throats of the bushing and male member serve to hold the members together during all normal movements of the parts.

It is, then, an object of this invention to provide a joint assembly wherein a male member is adapted for forced insertion into a resilient bushing and held in the bushing by cooperating restricted throats on the members.

A further object of the invention is to provide a resilient joint assembly having a pre-lubricated bearing surface carried by a resilient bushing and shaped to retain a cooperating member in proper bearing relation therein.

A specific object of the invention is to provide an inexpensive rubber-bushed joint assembly for gear shift rod connections of automotive vehicles.

Another specific object of the invention is to provide a joint assembly receiving a stud member in bearing relation therein and utilizing a simple eye turn on a rod to define a socket for the joint.

A further specific object of the invention is to provide pre-shaped rubber bushings having lubricant-impregnated fabric liners adapted to receive and retain complementally shaped stud members in bearing engagement therein.

A further specific object of this invention is to provide a rubber bushing having a recessed outer periphery adapted for engagement with a housing and an axial passageway normal to the recess having a restricted central portion to retain a stud member therein.

Other and further objects of the invention will become apparent to those skilled in the art from the following detailed description of the annexed sheets of drawings which disclose preferred embodiments of the invention.

On the drawings:

Figure 1 is a fragmentary perspective view of a steering post mounted gear-shift and transmission assembly embodying joints according to this invention.

Figure 2 is a fragmentary plan view of a joint assembly taken along the line II—II of Figure 1.

Figure 3 is a vertical cross-sectional view taken along the line III—III of Figure 2.

Figure 4 is a fragmentary vertical cross-sectional view, with parts in elevation, illustrating a slightly modified joint assembly according to this invention.

Figure 5 is a vertical cross-sectional view of a fabric-lined rubber bushing used in the joint illustrated in Figures 2 and 3.

Figure 6 is a side elevational view, with parts in vertical cross section, of a further modified joint assembly according to this invention.

Figure 7 is a vertical cross-sectional view taken through the fabric-lined rubber bushing of the joint in Figure 6 and illustrating the manner in which the joint stud is inserted in the bushing.

Figure 8 is a fragmentary side elevational view, with parts in vertical cross section, of a joint assembly according to this invention capable of carrying a thrust load.

Figure 9 is a vertical cross-sectional view of the fabric-lined rubber bushing used in the joint of Figure 8.

As shown on the drawings:

In Figure 1 the reference numeral 10 designates generally an automobile steering wheel and steering column mounted gear shift assembly. The assembly comprises a steering wheel 11 mounted on a steering column 12, a gear shift lever 13 operatively mounted on the upper end of telescoped shift rods such as 14. The rods 14 are suitably carried on the steering column 12. The rods such as 14 operate arms 15 and 16 which are connected through joint assemblies 17 of this invention to links 18 and 19. The other ends of the links 18 and 19 are connected through joints 20 of this invention to the shifting arms 21 and 22 respectively of a transmission 23. Operation of the steering column mounted shift lever 13 will effect a shifting of gears in the transmission 23 in accordance with known linkage arrangements.

As shown in Figures 2 and 3, the arm 15 has a stud 24 projecting normally therefrom. The stud 24 has a reduced end portion 25 seated in a bore 26 through the arm 15. The reduced portion 25 projects from a larger cylindrical portion 26 and a shoulder 26a is thus formed. This shoulder is bottomed against the arm 15 and the end of the reduced portion 25 is headed as at 25a to rigidly unite the stud to the arm.

The stud has a spool-shaped bearing portion composed of a cylindrical intermediate bearing surface 27 and frusto-conical bearing surfaces 28 and 29 at each end of the cylindrical surface. The frusto-conical surface 28 has the large end thereof adjacent the cylindrical portion 26 of the stud. The frusto-conical portion 29 terminates in a rounded head 29a adapted to act as an expanding medium for facilitating insertion of the stud into operative bearing position in a rubber bushed joint.

The link rod 18 has the upper end thereof bent to form an eye 18a. This eye 18a receives a rubber bushing 30. The bushing has an annular recess 31 around the periphery thereof adapted to receive the eye 18a. The annular recess 31 is segmental cylindrical in cross section as best shown in Figure 5.

The bushing 30 has an axial bore therethrough normal to the annular recess 31. This bore is shaped to receive the spool-shaped stud and thus has a constricted cylindrical central portion 32 with flared-out frusto-conical mouths 33 and 34 diverging from the ends thereof to the top and bottom faces of the bushing.

The bore is countersunk intermediate its ends as at 35 to receive a fabric liner 36 therein. The liner 36 is impregnated with graphite or other lubricant which is non-injurious to rubber. The rubber may be molded directly on the fabric, or the fabric may be cemented in position in the bore of the bushing.

It should be understood that oil- or grease-impregnated liners can be used with resilient bushings that are not harmed by such lubricant, such as, for example, artificial rubber and the like.

The bushing 30 shown in Figure 5 is readily adapted to be seated in the eye 18a of the link rod 18 and the stud 24 carried by the arm 15 is adapted to be forced through the bore of the bushing and held in position by the constricted throat portion of the bushing. The lubricated liner permits comparatively free rotation of the stud about its own axis and the resiliency of the bushing permits limited tilting of the stud relative to the eye. In this manner the arms 15 and 16 are readily connected through universal rubber-bushed joints to the link rods 18 and 19. In a similar manner the shift rods 21 and 22 can be connected to the lower ends of the link rods 18 and 19. As indicated in Figure 1, however, the lower ends of the link rods receive forged joint housings 18b and 19b thereon for carrying the rubber bushings.

As illustrated in Figure 4, a modified bushing 40 can have an annular recess 41 around the periphery thereof for seating in a straight cylindrical bore or opening of a housing arm 42. In other words, the recess 41 will be bounded by flat shoulders 41a and 41b for seating against the flat faces of the arm 42 around the cylindrical aperture therein. As also shown in Figure 4, the stud 43 can be formed integrally on the end of a rod 44.

In the modification shown in Figures 6 and 7, a rod or arm 50 has a cylindrical bore 51 therethrough terminating in frusto-conical or beveled ends 51a and having flat faces 51b normal to the bore. A rubber bushing 52 has a cylindrical recess 53 around the periphery thereof for seating in the bore 51. The recess is bounded by annular flanges 54 for seating against the flat faces 51b of the arm. As shown in Figure 7, these flanges 54 in their free state converge inwardly to define an opening therebetween which is of less width than the distance between the flat faces 51b of the arm 50. Thus when the bushing is forced into the cylindrical bore of the arm, these inturned flanges are flexed outwardly into a position normal to the bore and tightly grip the faces 51b of the arm to center the bushing in correct position. At the same time the outward flexing of the flanges 54 will tend to decrease the diameters of the cylindrical ends 55 of a spool- or hourglass-shaped axial bore 56 extending through the bushing for a purpose to be hereinafter described. The bore 56 of the bushing has a constricted central throat portion formed on a continuous curve merging into the cylindrical ends 55.

The entire bore through the bushing is lined with a lubricant-impregnated fabric liner 57 and, as shown, this liner extends to the ends of the bushing through the cylindrical end portions 55 of the bore. The bushing can be directly molded around the liner, or the liner can be secured in position in a previously molded bushing.

A cylindrical rod 58 has a constricted spool- or hourglass-shaped portion 59 near an end thereof adapted to fit in the bore 56 of the bushing 52. The end 58a of the arm 58 is of reduced diameter and threaded as best shown in Figure 7. The threaded portion 58a terminates in a frusto-conical portion 58b having the large end thereof adjacent the portion 59. As shown in Figure 7 the large end of the frusto-conical portion 58b and the rod 58 are of greater diameter than the diameter of the cylindrical portions 55 of the bushing bore so that an insertion of the rod in the bushing bore results in a tight fit between the cylindrical portions 55 of the bore and the rod. This tight fit serves to prevent ingress of dirt and egress of lubricant into the cooperating bearing surfaces provided by the portion 59 of the rod and spool- or hourglass-shaped portion 56 of the bore in the bushing. The frusto-conical portion 58b aids insertion of the rod through the bore of the bushing.

As shown in Figure 6 a washer 60 is disposed around the portion 58a of the rod 58 and bottomed against the small end of the frusto-conical portion 58b of the rod. The washer extends beyond the mouth of the bushing and serves as an additional seal for the joint assembly. The washer is held in position by a nut 61 threaded on the portion 58a of the rod and held in place by a cotter pin 61a.

When the bushing is inserted in the bore 51 of the arm 50 the flanges 54 are displaced from their inturned free position shown in Figure 7 into right-angular relation with the bottom of the recess 53 so as to tightly hug the opposite faces 51b of the arm. This outward displacement of the flanges also tends to flow the rubber into tighter engagement with the rod 58 and the large end of the frusto-conical portion 58b of the rod, thus further sealing the joint assembly.

The rod 58 is adapted to freely rotate axially of the bore in the bushing and interparticle flow of the bushing material also permits limited tilting movement of the rod.

The cooperating bearing portions 56 of the bore and 59 of the rod provide a constricted throat assembly serving to hold the bearing surfaces in proper alignment. However, the free end of the rod is adapted to be forced into position in the bushing and when it is once seated in the bushing, it is automatically aligned and retained in position. The washer 60, of course, prevents withdrawal of the rod from the bushing even in the event of material end thrust although the joint assembly is not intended to transmit material forces applied axially of the bore.

In the modification shown in Figures 8 and 9 the arm 65 has a cylindrical bore 66 therethrough countersunk at each end as at 66a to provide flared-out mouths. Flat faces 66b are provided normal to the bore at the large ends of the flared-out mouths 66a. A rubber bushing 67 has an annular recess 68 therearound seated in the bore 66 of the arm 65. As shown in Figure 9 the recess 68 is bounded by annular flanges 69 which, in their free state, are turned inwardly to face each other and when the bushing is seated in the bore, the flanges 69 tightly bottom against the flat faces 66b to hold the bushing in proper position in the arm.

The bushing has a spool- or hourglass-shaped axial bore 70 therethrough lined with a lubricant-impregnated fabric liner 71 which extends over the outer faces of the flanges 69 as shown.

A second arm 72 has a head portion 72a equipped with a stud projecting normally therefrom as shown in Figure 8. The stud has a reduced end portion 73 seated in a bore extending through the head 72a of the arm and a spool- or hourglass-shaped bearing portion 74 extending into the bushing from the reduced portion 73. The ends of the spool-shaped portion are of larger diameter than the reduced portion 73 so that the end of the spool 74 adjacent the reduced portion 73 is bottomed on the face of the head 72a. The bore through the head 72a is countersunk and the end of the reduced portion is headed as at 73a to tightly rivet the stud to the head.

The free end of the stud has a reduced cylindrical threaded portion 75 adapted to receive a retainer nut 76 in screw-thread relation therearound. A washer 77 is interposed between the nut 76 and the bushing 67 as shown in Figure 8.

The head 72a of the arm and the washer 77 are of larger diameter than the bore 66 of the arm 65 and the flanges 69 of the bushing as well as the fabric liner covering these flanges are interposed between the flat faces 66b of the arm 65, the washer 77 and the head 72a of the arm. The washer and head are therefore resiliently mounted against the bushing.

This joint construction is well adapted to transmit end thrust forces axially of the bore through the bushing since these forces will be accommodated through the flanges 69. At the same time, however, the metal surfaces of the washer 77 and the head 72a contact the lubricant-impregnated fabric liner 71, so that the same are free to rotate relative to the bushing. The spool- or hourglass-shaped stud 74, of course, can rotate in the bore 70 of the bushing. If desired the stud 74 and bore 70 can be cylindrical.

The head 72a and the washer 77 serve as seals for the joint assembly since they are tightly abutted against the bushing and prevent ingress of dirt and egress of lubricant.

The reduced free end 75 of the stud facilitates insertion of the stud through the axial bore of the bushing and the spool-shaped portion 74 of the stud cooperates with the spool-shaped bore 70 of the bushing to properly align the stud in the bushing. The restricted throat portion of the bore automatically aligns the spool- or hourglass-shaped stud in operative position. This type of joint is also well adapted for use on control arms of knee-action wheel suspensions.

From the above descriptions it should be understood that the joints of this invention have rubber-bushed lubricated bearing surfaces with restricted throat portions cooperating with complementally shaped studs to hold the studs in operative position and permit free rotation of the studs about their own axes. At the same time the rubber bushings accommodate limited universal movements and, in some embodiments of the invention, end thrusts can be accommodated through the joint assembly.

While the terms "spool-shaped" and "hourglass-shaped" have been used to define the configurations of the bushing bores and stud bearing surfaces, it should be understood that these terms are used in a generic sense to define any bore with a constricted throat and any stud with a constricted or reduced neck portion. The term "spool-shaped" as used in the claims therefore covers all bushing bores with constricted throats and enlarged mouths as well as all studs with constricted necks and enlarged ends.

The bushings of this invention are preferably molded from rubber with fabric liner sleeves, although other resilient bushing material could be used and liners other than fabric can also be used. The bushings have external annular recesses adapted to receive housing members which can take the form of eye ends on rods or bores through arm members. The bushings also have spool-shaped bores extending therethrough.

The joints of this invention are readily assembled, automatically aligning, self-contained and inexpensive to manufacture.

The rubber bushings are readily adapted to be seated in their housings through deformation of the rubber and are readily adapted for receiving studs or arm members therethrough also by deformation of the rubber. The outer recesses of the bushings are so formed as to engage opposite faces of a housing to retain the bushing in the housing. The engaging means can take the form of flanges or of fingers on the ends of a cylindrical recess. As shown in Figures 3, 4 and 5, the finger or flange on one face of the bushing can be smaller than the finger or flange on the opposite face of the bushing to facilitate insertion of the bushing into the housing.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A resilient joint assembly adapted for gearshift linkages comprising an arm member having an opening therethrough, a rubber bushing seated in said opening and extending over opposite faces of the arm, said bushing having an expansible bore therethrough coaxial with the arm opening, said bore having a constricted intermediate cylindrical portion and outwardly flared end portions, and a second arm having a stud member insertable through said bore of the bushing, said stud member having a constricted intermediate cylindrical portion and outwardly flared portions complementary in shape with the bushing bore whereby said bushing can be readily inserted in the opening of the first mentioned arm and said stud can be readily inserted through the expansible bore of the bushing and retained therein by the constricted intermediate portion of the bore to permit limited universal movement between the arm members while retaining the arms in assembled relation.

2. A resilient joint assembly comprising a cylindrical rod having an eye end, a rubber block having a groove around the periphery thereof adapted to receive said eye end of the rod, said block having a spool-shaped resiliently expansible bore therethrough, a lubricant-impregnated flexible fabric liner in said bore, a stud member having a complementally spool-shaped bearing portion in bearing engagement with said fabric liner of said bore, and a reduced free end portion on said stud facilitating insertion of the stud through said bore.

3. A resilient joint assembly comprising a housing having a bore therethrough, a rubber bushing having a recess around the periphery thereof bounded by outturned flanges, said bushing adapted for insertion through said bore of the housing and said flanges adapted for abutting opposite faces of the housing to hold the bushing in position, said bushing having a resiliently expansible bore therethrough with a constricted intermediate throat portion, a lubricant-impregnated flexible liner in said bore, and a stud member having a bearing portion with a constricted neck portion adapted for seating in said bore in bearing engagement with said liner, and a reduced-diameter threaded free end portion on said stud for facilitating insertion of the stud through said bore and for receiving retaining means to hold the stud in the bushing.

4. A resilient joint assembly comprising a housing having a cylindrical bore therethrough, a rubber bushing seated in said bore and having marginal portions bottomed against opposite faces of the housing, said bushing having a bore therethrough, a fabric liner for said bore extending over said marginal portions, a stud seated in said bore in bearing engagement with said liner, and stud retaining means on opposite faces of said housing in bearing engagement with the portions of the liner extending over the marginal portions of the bushing.

5. A rubber bushing for joint assemblies comprising a cylindrical block of rubber having an annular recess around the periphery thereof bounded by flanges converging toward each other, said bushing having a bore therethrough with cylindrical end portions and a constricted intermediate throat portion, and a lubricant-impregnated fabric liner in said bore united to said rubber.

6. A resilient joint assembly comprising a cylindrical metal rod having a circularly bent end defining an eye, a cylindrical rubber block in said eye having a deep circumferential groove of circular cross section receiving the circularly bent portion of the rod whereby the rims of the block will extend over and under the rod to retain the block in the eye, said block having an axial spool-shaped bore therethrough with a constricted intermediate cylindrical portion lying within the confined circle of the eye and with outwardly flared conical end portions extending from the cylindrical portion to the faces of the block, a stud in said bore having a complementary spool-shaped bearing portion, and a flexible lubricant-impregnated liner between the stud and block and secured to the block whereby said cylindrical portions of the stud and liner facilitate relative rotating movements between the stud and block while said conical end portions retain the cylindrical portion of the stud within the confined circle of the eye and whereby said block permits tilting movements of the stud relative to the rod.

7. A joint assembly comprising a housing having an opening therethrough, a resilient bushing having a peripheral recess seated in said opening of the housing and having marginal rim portions overlying the housing at both ends of the opening to thrust thereagainst and retain the bushing in fixed relation to the housing, said resilient bushing having a bore therethrough with an expansible constricted intermediate throat portion lying in the housing and adapted for temporary enlargement upon application of appreciable expanding force to accommodate passage of an enlarged rigid stud portion while reclaiming the original constricted size upon cessation of the expansion force, and a stud in said bore having a complementally shaped bearing portion in bearing relation with the bushing whereby said stud can be inserted through the expansible bore of the bushing and be retained therein by said constricted intermediate portion of the bore.

8. A resilient joint assembly comprising a metal rod having a looped portion defining an eye, a resilient rubber block in said eye having a circumferential groove receiving the looped portion of the rod whereby the rims of the block will extend over and under the rod to retain the block in the eye, said block having an axial bore therethrough with a constricted intermediate portion in the confined portion of the eye and with outwardly flared end portions extending to the faces of the block, a stud in said bore having a bearing portion complemental in shape with said bore, and a flexible liner between the stud bearing portion and the block secured to the block whereby said constricted intermediate portion of the bore is adapted to be expanded through deformation of the liner and rubber block for snugly receiving the stud while said outwardly flaring portions of the bore and complementally shaped portions of the stud retain the stud in seated position.

MARSHALL HOMER ALLDREDGE.